United States Patent [19]

Adickes

[11] 4,335,798
[45] Jun. 22, 1982

[54] TRACTOR

[75] Inventor: Henning Adickes, Heidelberg, Fed. Rep. of Germany

[73] Assignee: Deere & Company, Moline, Ill.

[21] Appl. No.: 164,799

[22] Filed: Jun. 30, 1980

[30] Foreign Application Priority Data

Jul. 27, 1979 [GB] United Kingdom ............... 7926194

[51] Int. Cl.³ .................................................. B60K 37/00
[52] U.S. Cl. .................................. 180/90; 180/69 R; 180/315
[58] Field of Search .................. 180/69 R, 69 C, 90, 180/89.12-89.18, 315; 296/70, 190-198

[56] References Cited

U.S. PATENT DOCUMENTS

| 1,381,166 | 6/1921 | Christianson | 180/69 R |
| 1,446,814 | 2/1923 | Scott | 180/69 R |
| 2,833,364 | 5/1958 | Lee | 180/69 R |
| 2,952,328 | 9/1960 | Steiner | 180/69 R |
| 3,319,731 | 5/1967 | Kenkel | 180/315 X |
| 3,743,045 | 7/1973 | Hansen | 180/69 R |
| 3,789,945 | 2/1974 | Hansen | 180/69 R |

FOREIGN PATENT DOCUMENTS 2127686 12/1972 Fed. Rep. of Germany .
2342449 3/1974 Fed. Rep. of Germany .
2360753 3/1978 France .

Primary Examiner—Richard A. Bertsch
Assistant Examiner—Donald W. Underwood

[57] ABSTRACT

A tractor includes a dash which houses various components of the tractor. A pair of dash panels enclose the top and sides of the dash. Each side of the tractor includes lower front and upper rear hinge members mounted thereon. Each panel includes complimentary hinge members pivotally engagable with the front and rear tractor hinge members. The hinge members are disposed so that the panels may swing between closed and open positions without engaging other components of the tractor, such as the steering wheel or foot pedals.

8 Claims, 5 Drawing Figures

TRACTOR

BACKGROUND OF THE INVENTION

This invention relates to a dash panel hinge system for a tractor.

The conventional arrangement in a tractor of a steering wheel, a dash, a clutch pedal and a pair of brake pedals close to the left and right-hand bottom sides, respectively, of the dash, mudguards, and a driver's seat provides only a little free space into which such parts do not intrude.

The dash houses a battery and other electrical equipment which, from time to time, need attention. It is desirable that access can be had to this equipment as easily as possible.

SUMMARY OF THE INVENTION

According to the present invention, a tractor has a dash, a steering wheel extending above the dash, foot pedals on either side of the bottom of the dash, and a panel for covering a side of the dash and arranged to swing about a hinge axis between a closed position and an open position, the hinge axis being disposed so that the panel swings cleanly without fouling the parts which intrude into the space in the region of the dash. Preferably, a pair of panels is provided for covering left and right-hand sides of the dash, respectively.

DETAILED DESCRIPTION OF THE INVENTION

Figure 1:
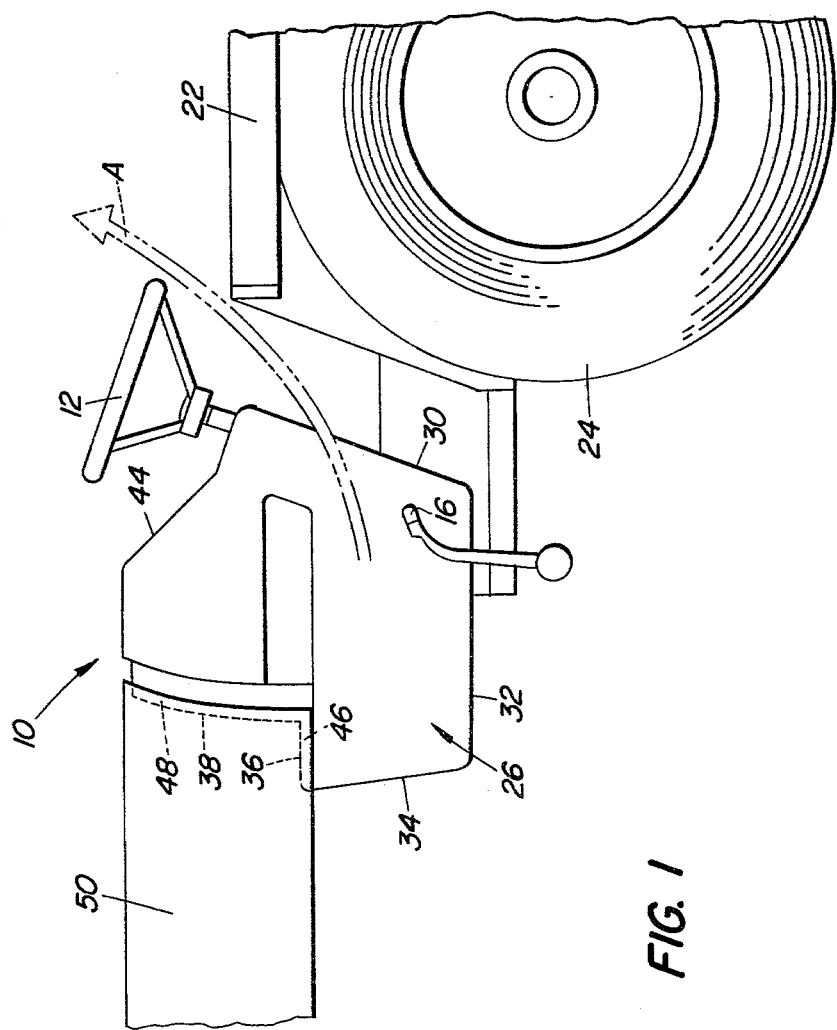
FIG. 1 is a left side view of a portion of a tractor at the region of the dash.
Figure 2:
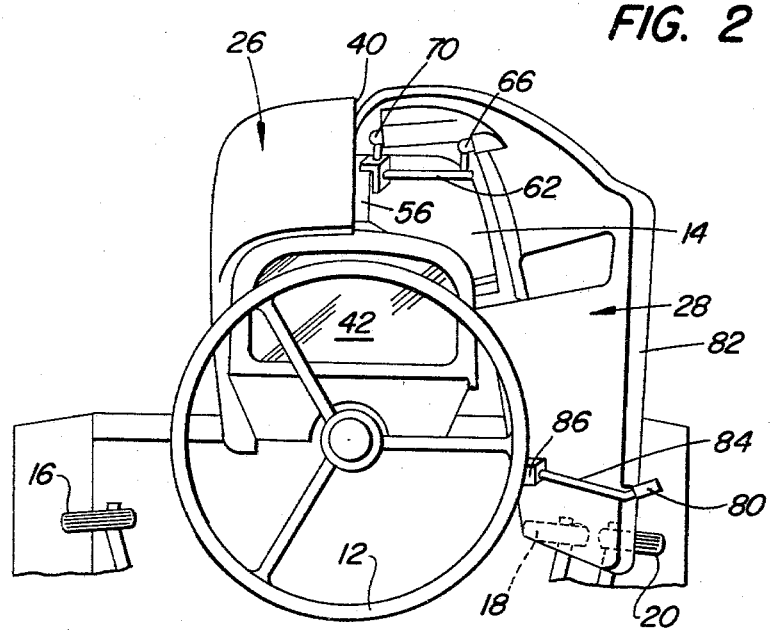
FIG. 2 is a perspective view of the region shown in FIG. 1, but looking forwardly from the driver's seat.

Referring particularly to FIGS. 1 and 2, a tractor 10 has a conventional disposition of an adjustable steering wheel 12 mounted at the rear of a dash 14 which has an adjustable clutch pedal 16 to its left and a pair of adjustable brake pedals 18, 20 to its right and which contains a battery, various electrical services, and so on (not shown). As usual, references to "left" and "right" herein are from the point of view of the driver. The sides and top of the dash itself are open. A short distance rearwardly, from the dash 14 and at the sides of the tractor 10, there are mudguards (or fenders) 22 over two rear drive wheels, only one of which is shown and designated 24.

It will be appreciated that the space between the dash 14 and the pedal 16, on the one hand, and the pedals 18, 20 on the other, as well as that between the steering wheel 12, driver's seat (not shown) and the mudguards 22, is very limited, particularly in the case of some extreme positions of the steering wheel and pedals.

The devices contained within the dash require servicing, repair of replacement, from time to time, and it is therefore highly desirable that they be easily and quickly accessible.

For this purpose, two specially mounted cover panels 26, 28, of pressed steel sheet, are provided, which constitute a housing for left side and top portions and right side and top portions, respectively, of the dash 14. One panel is the mirror image of the other and the panels 26, 28 in their functioning, i.e. closed position (shown in FIG. 1 and the left-hand side of FIG. 2), jointly extend on either side of the dash 14 and in an arch around the top of the dash 14. They are, of course, disposed inwardly of the pedals 16, 18, and 20.

The lower portion of each panel is defined as follows. Each panel has a rearmost edge 30 which extends rearwardly and upwardly from a horizontal bottom edge 32 which is spaced just a short distance above floor level. A forwardmost edge 34 extends forwardly and upwardly from the bottom edge 32 to a shoulder 36 running rearwardly. The upper portion of the panel is defined by a forward edge 38 running upwardly from the shoulder 36 and curving over the forward end of the dash and terminating at a geometrically fore-and-aft line of the tractor 10 lying in a vertical plane through the center of the steering wheel 12. An uppermost edge 40 follows this line rearwardly to the top of an instrument panel 42 and an upper edge 44 extends downwardly and rearwardly, aligned initially with the instrument panel 42, to join the rearmost edge 30 at a level spaced somewhat below the steering wheel 12.

The edges 36 and 38 are those of recessed portions 46, 48 which provide a seat for the rear portion of a hood 50 for an engine (not shown).

Figure 4:
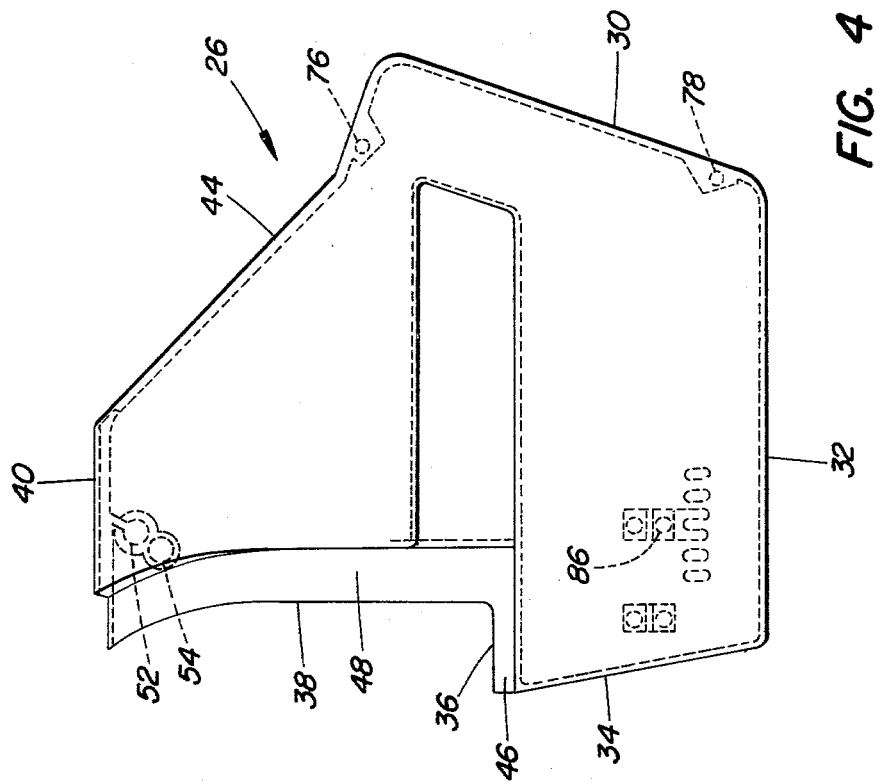
FIG. 4 is a side view of a cover panel for the left-hand side of the dash.
Figure 5:
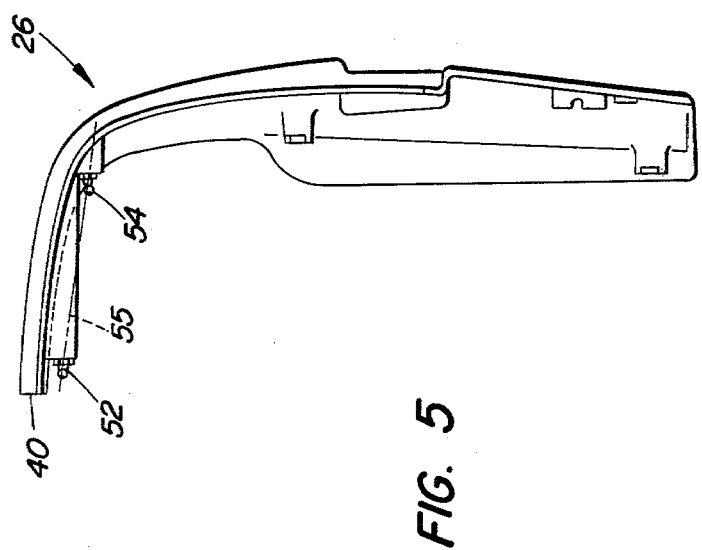
FIG. 5 is an end view of the panel of FIG. 4 looking from the front.

The manner of mounting the panels 26, 28 will now be described. Each panel is provided on its inner face at its upper forward portion, as best seen in FIGS. 4 and 5, with an upper hinge ball 52 close to the uppermost edge 40 and a lower hinge ball 54, the hinge balls lying on a geometrical line 55 or hinge axis included at 19.5 degrees to the horizontal. The upper hinge ball 52 lies somewhat rearwardly of the lower hinge ball 54 and the geometrical line 55 joining the hinge balls 52, 54 is also at an angle of 2 degrees to a geometrical line 57 passing through corresponding lower hinge balls of both panels. For clarity, this latter angle is exaggerated in FIG. 3.

Figure 3:
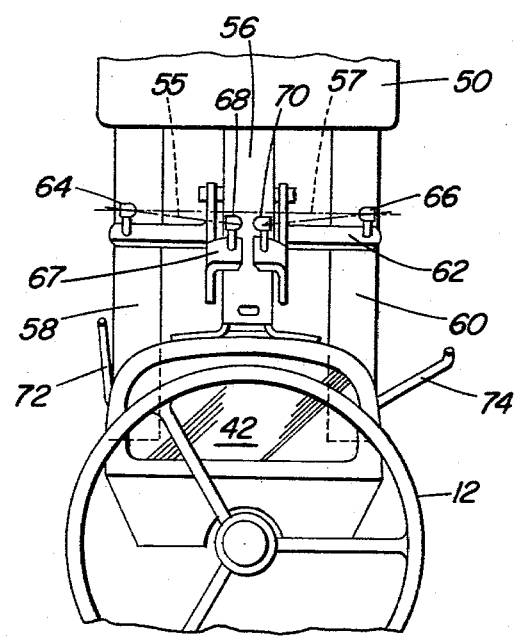
FIG. 3 is a top perspective view of the dash with cover panels removed.

The dash 14 includes, as will be seen from FIG. 3, a central upper fore-and-aft bar 56 at the top of the dash 14, a lower left-hand bar 58 also fore-and-aft spaced from the top of the dash 14, and a corresponding lower right-hand bar 60. A crossbar 62 is rigidly attached to the central bar 56 and carries, at its ends, a front left-hand hinge socket 64 and a front right-hand hinge socket 66. The central bar 56, in turn, carries a pair of upwardly extending brackets 67 rearwardly of the crossbar 62 supporting a rear left-hand hinge socket 68 and a rear right-hand hinge socket 70. A left-hand support rod 72 is pivotally connected to the underside of the lower left-hand bar 58 at the rod's rearward end. Similarly, a right-hand support rod 74 is pivotally connected to the lower right-hand bar 60.

Taking the left-hand panel 26, it is mounted with its hinge balls 52, 54 engaged in the rear left-hand hinge socket 68 and the front left-hand hinge socket 64, respectively. The right-hand panel 28 is correspondingly mounted, its hinge balls 52 and 54 being received in the hinge sockets 70, 66, respectively.

An upper and lower locating lug 76, 78 is secured to the inner face of each panel 26, 28 and in the functioning (closed) position of the panels, these lugs are received in locating slots (not shown) in the dash.

The panels 26, 28 each also have a conventional-type latch mechanism to secure them in their funtioning position. This mechanism includes a handle 80 located alongside an inwardly extending flange 82 on the rearmost edge 30 of the panel and rigidly attached to a rod 84 passing through an aperture (not shown) in the flange 82 and located in a support 86 and carrying at its forward end a clamp which can engage a clamp aperture (not shown) in the dash 14. On turning of the handle 80, the clamp can be locked in or released from the clamp aperture.

Thus, to open a cover panel 26 or 28 when in the closed position, it is necessary only: to turn the handle 80 to release the clamp; to swing the panel upwardly in the direction of arrow A in FIG. 1 about the hinge sockets 64, 68 or 66, 70 to the open position as illustrated in relation to the right-hand panel 28 in FIG. 2; and to swing the appropriate support rod 72 or 74 below the panel so that the panel rests on the rod. No tools are required to open the panels 26, 28, and they swing cleanly, i.e. without fouling the pedals 16, 18, 20, the steering wheel 12, the mudguards 22 or the driver's seat (not shown) due to the chosen disposition of the hinge axis 55 about which the panels are swung. Furthermore, the panels 26, 28 remain attached to the tractor throughout.

I claim:

1. A tractor having a dash, a steering wheel extending from the dash, foot pedals on either side of the bottom of the dash, a panel for covering a side of the dash and hinge means for coupling the panel to the dash and for allowing the panel to swing between a closed position and an open position, the hinge means being disposed so that the panel engages only the hinge means while swinging between the open and closed positions, the hinge means comprising a central fore-and-aft bar at a top portion of the dash, a crossbar extending on at least one side of the central bar, a front dash hinge member on an outboard portion of the crossbar and a rear dash hinge member rearwardly thereof and on the central bar above the level of the front dash hinge member, and corresponding panel hinge members on the panel for pivotally engaging the dash hinge members.

2. A tractor, according to claim 1, having a pair of panels for covering left and right sides of the dash, respectively.

3. A tractor, according to claim 1, in which the panel extends above the dash to approximately a geometrically fore-and-aft line lying in a vertical plane through the center of the steering wheel.

4. A tractor, according to claim 1, in which the rear dash hinge member is mounted on a bracket secured to the central bar.

5. A tractor, according to claim 1, in which the dash hinge members and the corresponding panel hinge members are comprised of hinge sockets and hinge balls.

6. A tractor, according to claim 1, in which the panel includes a recess in a forward portion thereof to form a seat for a hood of the tractor.

7. In a tractor having a dash, a steering wheel extending from the dash, foot pedals on either side of the bottom of the dash, and a panel for covering a side of the dash, a panel hinge system comprising:
a central fore-and-aft bar positioned on a top portion of the dash;
a crossbar extending on at least one side of the central bar;
a front tractor hinge member on an outboard portion of the crossbar;
a rear tractor hinge member positioned on the central bar rearwardly from and above the front tractor hinge member; and
panel hinge members corresponding to and pivotally engaging the tractor hinge members, the tractor and panel hinge members cooperating so that the panel pivots without being obstructed by the steering wheel and foot pedals.

8. In a tractor having a dash, a steering wheel extending from the dash, foot pedals on either side of the bottom of the dash, and panels for covering sides of the dash, a panel hinge system comprising:
a central fore-and-aft bar positioned on a top portion of the dash;
a crossbar extending on either side of the central bar;
front tractor hinge members on outboard portions of the crossbar on either side of the central bar;
rear tractor hinge members, each positioned on the central bar rearwardly from and above a corresponding one of the front tractor hinge members; and
panel hinge members corresponding to and pivotally engageable with the tractor hinge members, the tractor and panel hinge members cooperating so that the panels may be pivoted without engaging the steering wheel and without engaging the foot pedals.

* * * * *